W. NEVINS.
Potato-Planter.
No. 42,014. Patented Mar. 22, 1864.
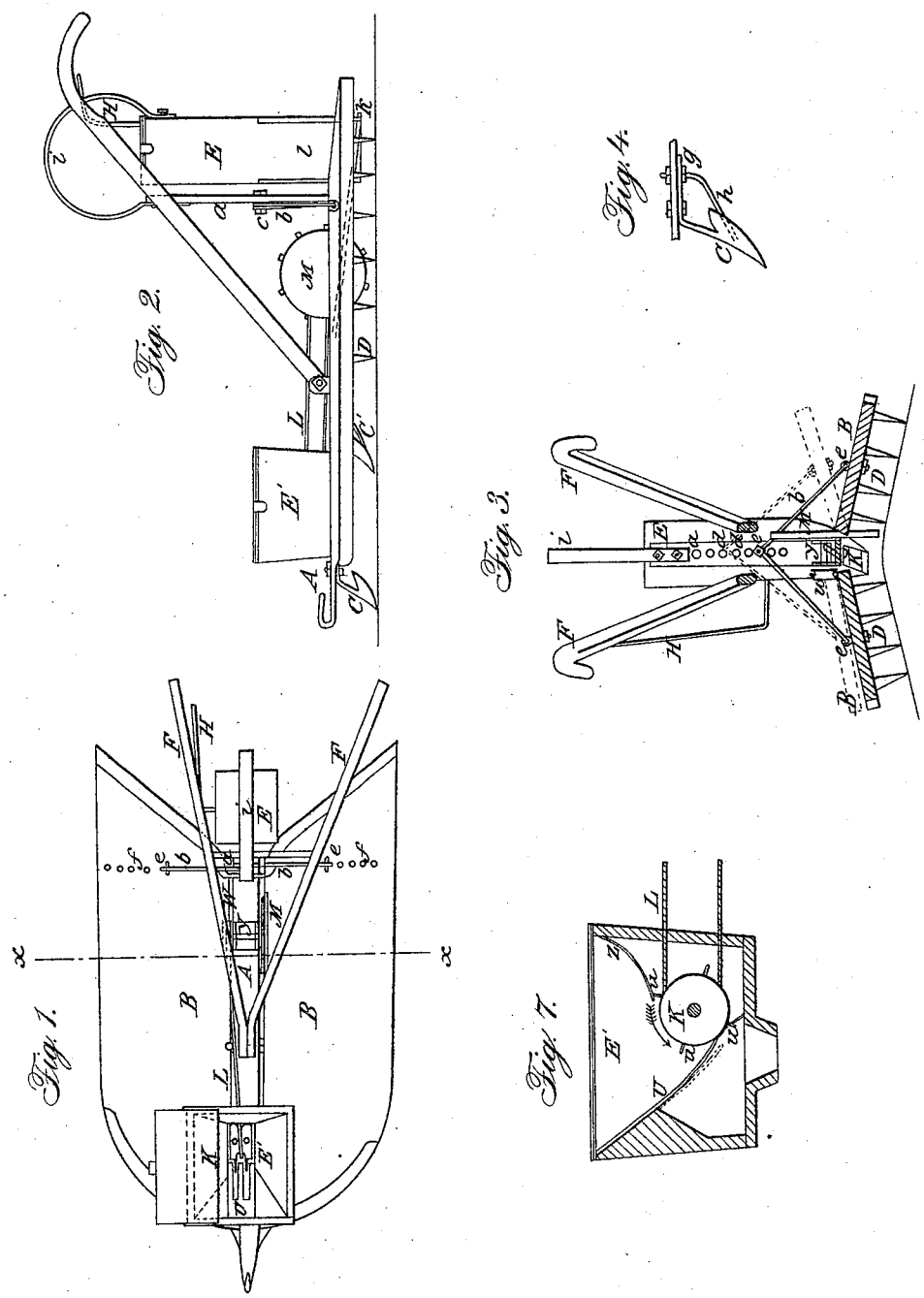
Witnesses:
Chas F. Spencer
A. E. Fraser
Inventor:
Wm Nevins
By J. Fraser & Co
Atty

UNITED STATES PATENT OFFICE.

WILLIAM NEVINS, OF IRVING, NEW YORK.

IMPROVEMENT IN POTATO-PLANTERS.

Specification forming part of Letters Patent No. 42,014, dated March 22, 1864.

*To all whom it may concern:*

Be it known that I, WILLIAM NEVINS, of Irving, in the county of Chautauqua and State of New York, have invented certain new and useful Improvements in Seed-Planters; and I do hereby declare that the following is a full and exact description thereof, reference being had to the accompanying drawings, making part of this specification.

Figure 1 is a plan of my improved machine; Fig. 2, a side elevation thereof; Fig. 3, a transverse vertical section of the same in the plane of line $x\ x$, Fig. 1; Fig. 4, a side elevation of one of the mold or share teeth; Fig. 5, an enlarged central vertical section of the potato-hopper and its operating parts.

Like letters of reference indicate corresponding parts in all the figures.

My invention consists in the combination of a seed-planter with a peculiarly-arranged cultivator, whereby the seed is deposited or planted on a ridge, and also in the particular arrangement of the seeding device itself, as hereinafter described.

The cultivator is formed as follows: The beam A, I make of a metal bar of suitable length, and bend it at right angles at the rear, so as to form a vertical standard, $a$. By this construction the beam is especially adapted to the purpose for which it is designed, allowing the cultivator-wings to be adjusted by means of the holes $d$, and the traction-wheel by which the potato-planter is operated is easily and securely attached, as hereinafter described, while the device is very strong and cheap. To this beam are jointed, both in front and rear, on opposite sides, respectively, wings B B, so as to adjust or turn vertically. These wings are connected with the standard $a$ by means of brace-rods $b\ b$, secured at the upper end to a bolt, $c$, which fits in any one of a set of holes, $d\ d$, in said standard, and at the lower end to eyes $e\ e$, or their equivalent, fitting in any one of a set of holes, $f\ f$, in the wings. By raising or lowering the bolt $c$ in the holes $d$ the angle of the wings may be changed as desired.

I prefer to use a central double mold or share tooth, C, in the front end of the beam, and two similar single mold-teeth, C' C', secured respectively to the wings on either side of the beam a little distance in the rear of the front tooth. The remainder of the wings in the rear are filled with ordinary straight-pointed teeth, D D.

For planting potatoes I employ a hopper, E, of suitable size on the beam, located a little in the rear of the double mold-tooth C, but between it and the single mold-teeth C' C', so that the former will open a furrow to receive the seed and the latter will turn the furrow back, covering the seed, while the pointed teeth in the rear on either side of the center will assist in forming the ridge.

At a suitable position in the hopper is situated a roller, K, having one, two, or more sets of points, $u\ u$, Fig. 7, which, as they revolve, catch the potatoes and carry them forward past a light spring, $v$, yielding sufficiently for the purpose, and deposit them in a spout leading from the bottom of the hopper downward one side of the beam.

The roller is operated by means of an endless chain, L, passing over it and extending backward over a pulley, $w$, which receives its motion by means of a traction-wheel, M, on its shaft, which runs on the ground. This traction-wheel may either rest in bearings $y\ y$, secured rigidly to the beam, as represented in the drawings, or it may be secured to spring-bearings that will allow it to adapt itself to the irregular surface of the ground.

To prevent the potatoes falling behind the roller K and interfering with the chain L, I place above it an inclined sheet-metal guard, $z$, which may be loose at its lower end, so that the teeth of the roller will cause it to vibrate and shake the potatoes down to the place of discharge.

The advantages of the arrangement above described are manifest. It is desirable in many and, indeed, in most kinds of soil that the "hills" of potatoes, and sometimes of other seeds, should be planted on a ridge, so that the water will settle between the rows. This is especially essential in wet soil or in a wet season. My device accomplishes the ridging and the planting at one and the same operation—an effect that is not accomplished in any other arrangement with which I am acquainted. The wings of the cultivator, by being set at an angle, have a tendency to work the soil toward the center, thus forming an elevation, and this elevation may be increased or diminished by varying the angle of the wings. The additional stirring of the soil around the rows produced by the cultivator is also an advantage.

By removing the seed-planter and reversing the teeth the cultivator is in condition for cultivating between the rows of plants, the angle of the wings being adjusted to an upward inclination, so as to form a hollow between the rows and turn the soil outward around the plants.

What I claim as of my invention, and desire to secure by Letters Patent, is—

1. The combination of a potato-planter, E, or equivalent, with a cultivator provided with adjustable angular wings B B, by which a ridge is formed and the seed planted on the same, substantially as herein set forth.

2. The combined construction and arrangement of the potato-planter proper, consisting of the roller K, provided with teeth $u$ $u$, the spring $v$, endless chain L, driven by the traction-wheel M, and the shield $z$, vibrated by means of the roller-teeth, so as to shake down the potatoes in the hopper, the whole operating substantially as herein specified.

In witness whereof I have hereunto signed my name in the presence of two subscribing witnesses.

WM. NEVINS.

Witnesses:
ELLIS S. SPENCER,
CHAS. McNEAL.